(12) United States Patent
Miyazaki et al.

(10) Patent No.: US 10,923,140 B2
(45) Date of Patent: Feb. 16, 2021

(54) DEVICE, ROBOT, METHOD, AND RECORDING MEDIUM

(71) Applicant: Panasonic Intellectual Property Management Co., Ltd., Osaka (JP)

(72) Inventors: Ryouta Miyazaki, Osaka (JP); Yusaku Ota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 16/205,179

(22) Filed: Nov. 29, 2018

(65) Prior Publication Data

US 2019/0279643 A1    Sep. 12, 2019

(30) Foreign Application Priority Data

Mar. 8, 2018   (JP) .............................. JP2018-042273

(51) Int. Cl.
    G10L 25/78      (2013.01)
    G10L 17/06      (2013.01)
    G06F 3/16       (2006.01)
    G10L 17/00      (2013.01)

(52) U.S. Cl.
    CPC .............. *G10L 25/78* (2013.01); *G06F 3/167* (2013.01); *G10L 17/06* (2013.01); *G10L 17/00* (2013.01)

(58) Field of Classification Search
    CPC ....... G10L 17/005; G10L 17/06; G10L 17/00; G10L 25/78; G06F 3/167
    See application file for complete search history.

(56) References Cited

U.S. PATENT DOCUMENTS

| 2007/0083374 A1* | 4/2007 | Bates | .................... G10L 15/197 |
| | | | 704/257 |
| 2019/0156222 A1* | 5/2019 | Emma | .................... G06N 20/00 |
| 2019/0378024 A1* | 12/2019 | Singh | ................ G06F 16/90332 |

FOREIGN PATENT DOCUMENTS

| JP | 2013-073355 | 4/2013 |
| JP | 2016-006607 | 1/2016 |

OTHER PUBLICATIONS

Hwang et al., "TalkBetter: family-driven mobile intervention care for children with language delay," CSCW '14: Proceedings of the 17th ACM conference on Computer supported cooperative work & social computing, Feb. 2014, pp. 1283-1296, https://doi.org/10.1145/2531602.2531668 (Year: 2014).*

* cited by examiner

*Primary Examiner* — Michelle M Koeth
(74) *Attorney, Agent, or Firm* — Greenblum & Bernstein, P.L.C.

(57) ABSTRACT

When speech of a first user includes a first word that is stored in a memory and associated with the first user, it is determined whether or not a difference between a first time and a second time is equal to or less than a predetermined time. The first time is a current time at which the first user spoke the first word. The second time is a time at which a second user last spoke a second word associated with the first word. When the difference between the first time and the second time is equal to or less than the predetermined time, a speaker outputs speech of a same content associated with the first word and the second word.

18 Claims, 6 Drawing Sheets

FIG. 3

| SPEAKER REGISTRATION TABLE | | |
|---|---|---|
| No | REGISTERED SPEAKER | VOICEPRINT |
| 1 | USER A (CHILD) | ... |
| 2 | USER B (MOTHER) | ... |
| ⋮ | | |

| PERFORMANCE TRIGGER TABLE | | | | | |
|---|---|---|---|---|---|
| No | CONTENT | USER A (CHILD) C401 | | USER B (MOTHER) C402 | |
| | | TERM | TIME | TERM | TIME |
| 1 | CARROTS | DON'T LIKE | 12:15:10 | CARROTS | 12:15:15 |
| 2 | TIDYING | NO | 14:58:20 | TIDYING | – |
| 3 | TOILET | DON'T WANT TO GO | – | TOILET | 17:41:05 |
| 4 | SLEEPING | DON'T WANT TO SLEEP | – | AREN'T YOU GOING TO SLEEP? | 18:03:03 |
| 5 | BRUSHING TEETH | DON'T WANT TO | 07:30:40 | BRUSHING TEETH | 07:30:31 |
| ⋮ | | | | | |

FIG. 5

PERFORMANCE TRIGGER TABLE T2'

| No | CONTENT | USER A (CHILD) | | ROBOT RA | | ROBOT RB | |
|---|---|---|---|---|---|---|---|
| | | TERM | TIME | TERM | TIME | TERM | TIME |
| 1 | CARROTS | DON'T LIKE | 12:15:10 | CARROTS | 12:15:15 | LIKE | 12:15:18 |
| 2 | TIDYING | NO | 14:58:20 | TIDYING | – | TOGETHER | – |
| 3 | TOILET | DON'T WANT TO GO | – | TOILET | 17:41:05 | WHERE | 17:41:10 |
| 4 | SLEEPING | DON'T WANT TO SLEEP | – | AREN'T YOU GOING TO SLEEP? | 18:03:03 | TOGETHER | 18:03:07 |
| 5 | BRUSHING TEETH | DON'T WANT TO | 07:30:40 | BRUSHING TEETH | 07:30:31 | TOGETHER | – |
| ... | | | | | | | |

DEVICE, ROBOT, METHOD, AND RECORDING MEDIUM

BACKGROUND

1. Technical Field

The present disclosure relates to a device and the like that communicate with a plurality of users.

2. Description of the Related Art

Recently, researches on robots that detect the intention of a user from user's speech and perform an appropriate action for the user are underway.

For example, Japanese Unexamined Patent Application Publication No. 2013-73355 (Patent document 1) discloses a technique that, by using a dialog state where a first speaker and a second speaker are having a conversation using different languages, determines presence of unknown information for one of the speakers and presents supplementary information to that speakers at a predetermined timing when outputting a translation result of the conversation of the other speaker.

Japanese Unexamined Patent Application Publication No. 2016-6607 (Patent document 2) discloses a dialog-type communication system that monitors the state of a conversation between a plurality of terminal devices connected to each other via a network and, when the state of the conversation is in a plateau, obtains a conversation topic relating to the conversation from a search site and provides the conversation topic to the terminal device.

SUMMARY

In Patent document 1 and Patent document 2, however, in a situation where a plurality of users are having a conversation, there is no measure to prevent the other speaker from finding out a content activation instruction sent from one of the speakers to a robot. Thus, a further improvement is desired.

In one general aspect, the techniques disclosed here feature a device communicating with a plurality of users, the device including a microphone that collects sound in vicinity of the device, a loudspeaker, a memory, and a processor, wherein the processor determines whether or not the sound includes a speech of a first user; determines, when determined that the sound includes the speech of the first user, whether or not the sound includes a first word, the first word being stored in the memory and associated with the first user, the memory at least linking the plurality of users, words associated with the plurality of users, and times at which the words associated with the plurality of users are last spoken; determines, when determined that the sound includes the first word, whether or not a difference between a first time and a second time is equal to or less than a predetermined time, the first time being time at which the first user last spoke the first word and being current time, the second time being time at which a second user last spoke a second word associated with the first word in the memory, the second user being different from the first user, the first word and the second word being associated with a same content, and causes, when determined that the difference between the first time and the second time is equal to or less than the predetermined time, the loudspeaker to output a speech associated with the content.

These general and specific aspects may be implemented using a computer program, and any combination of systems, methods, and computer programs.

The present disclosure enables to prevent one of users from finding out that an output speech is output in response to an operation by another one of the users.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating one example of a speaker registration table;

FIG. 4 is a diagram illustrating one example of a performance trigger table;

FIG. 5 is a diagram illustrating one example of the performance trigger table in a case where the robot illustrated in FIG. 1 is used in a conversation between a user and another robot that is different from the robot illustrated in FIG. 1;

DETAILED DESCRIPTION

Figure 1:
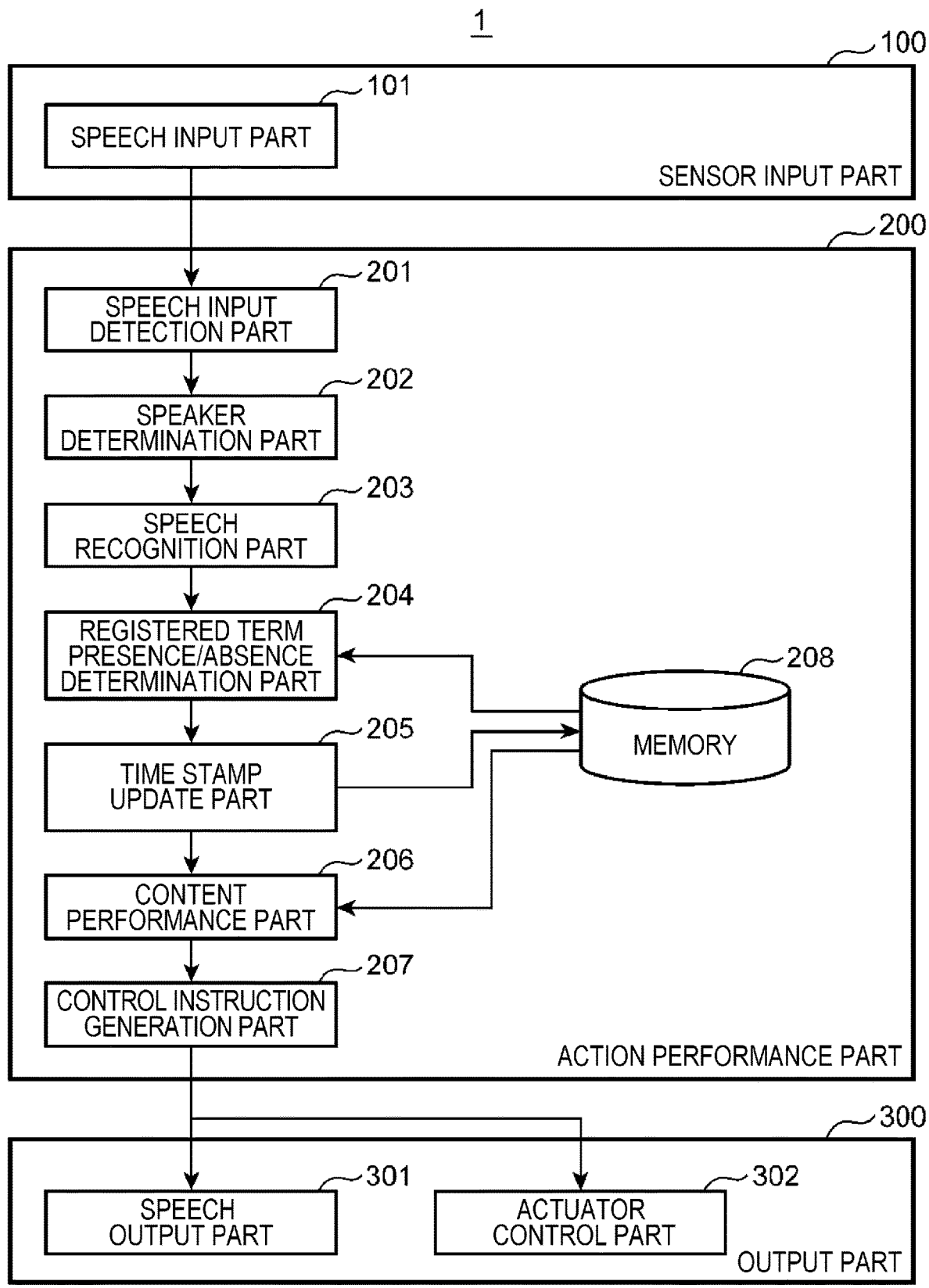
FIG. 1 is a block diagram illustrating one example of a configuration of a robot according to an embodiment of the present disclosure.

Circumstances that LED to the Present Disclosure

The inventor of the present invention is studying various contents to be performed by robots to assist guardians such as mothers and the like in teaching children about discipline. For example, in a case where a child who dislikes carrots says, "I don't like carrots" and a mother who wishes that her child would eat carrots says, "Let's eat carrots", the mother's wish may be fulfilled if there is a content by which a robot performs a story for the child so that the child becomes fond of carrots.

In order to make the robot perform such content, for example, the mother needs to pick up a mobile terminal such as a smartphone and carries out an operation to input a content activation instruction.

However, when the mother picks up the smartphone and carries out the operation to input an activation instruction in the midst of conversation with the child, attention of the child turns to the mother's action. Thus, this pose an issue that the child finds out that the content the robot performs is based on the instruction of the mother. This not only creates a cynical mood in the child but may instead arouse a rebellious spirit of the child against the mother, and a sufficient discipline effect may not be attained.

In Patent document 1 described above, for example, with regard to "Wiener Schnitzel", supplementary information such as that "it is the breaded and fried veal escalope in Vienna style and is one of typical examples of Austrian cuisines" is output. In Patent document 1, however, the supplementary information is just output relating to a subject of a speech of one of the first speaker and the second speaker, and the performance of content is not triggered by subjects of speeches of both speakers.

Further, Patent document 2 is to output a topic relating to the conversation when a conversation between users becomes stagnant. However, when the conversation between users is not stagnant, the device will not function. Thus, the performance of a content cannot be triggered by a subject of speech between users.

Accordingly, neither Patent document 1 nor Patent document 2 can perform a content by using a subject of speech between the users as a trigger, and the mother has no other way but to input an activation instruction of a content. Thus, an issue that the child finds out the operation of inputting an activation instruction cannot be resolved.

In view of the above, the inventor of the present invention has perceived the present disclosure by finding that the foregoing issues can be resolved, for example, in a case where a child says, "I don't like carrots" and a mother says to the child, "Let's eat carrots", by causing a robot to perform a content for the child to make the child become fond of carrots by using a subject of speech of the child and a subject of speech of the mother as a trigger.

An aspect of the present disclosure is
a device communicating with a plurality of users, including:
a microphone that collects sound in vicinity of the device;
a loudspeaker;
a memory; and
a processor, wherein
the processor
determines whether or not the sound includes a speech of a first user,
determines, when determined that the sound includes the speech of the first user, whether or not the sound includes a first word, the first word being stored in the memory and associated with the first user, the memory at least linking the plurality of users, words associated with the plurality of users, and times at which the words associated with the plurality of users are last spoken,
determines, when determined that the sound includes the first word, whether or not a difference between a first time and a second time is equal to or less than a predetermined time, the first time being time at which the first user last spoke the first word and being current time, the second time being time at which a second user last spoke a second word associated with the first word in the memory, the second user being different from the first user, the first word and the second word being associated with a same content, and
causes, when determined that the difference between the first time and the second time is equal to or less than the predetermined time, the loudspeaker to output a speech associated with the content.

According to such configuration, when it is detected that a speech of the first user includes the first word, a speech of a content associated with the first word and the second word is output if the second word associated with the first word and spoken by the second user is registered in the memory and the time difference between time-of-speech of the first word and time-of-speech of the second word is equal to or less than the predetermined time.

This enables to output a speech based on a content without inputting an activation instruction by one of the first user and the second user, thereby preventing one of the users from finding out that the output speech is output in response to an operation by the other user.

In the foregoing configuration, the processor may further updates, when determined that the sound includes the first word, time at which the first user spoke the first word to the first time in the memory.

According to such configuration, when a speech of the first user includes the first word, the first time registered in the memory is updated to time at which the first word has been spoken. Thus, with regard to the time-of-speech of the first word by the first user, the memory can always register the most current time-of-speech.

In the foregoing configuration, the first user may be a guardian of the second user.

According to such configuration, in a situation where a guardian who is the first user and a protected person who is the second user are having a conversation, the guardian can start the device to output a speech of a content without inputting an activation instruction for the content.

In the foregoing configuration, the first user may be another device different from the device,
the second user may be an infant, and
the another device may include
a microphone that collects sound in vicinity of the another device,
a loudspeaker,
a memory, and
a processor.

According to such configuration, in a situation where the first user who is an infant and the another device which is the second user are having a conversation, the device can be started to output a speech of a content without inputting an activation instruction for the content.

In the foregoing configuration, the second user may be a guardian of the first user.

According to such configuration, in a situation where a guardian who is the second user and a protected person who is the first user are having a conversation, the guardian can start the device to output a speech of a content without inputting an activation instruction for the content.

In the foregoing configuration, the first user may be an infant,
the second user may be another device different from the device, and
the another device may include
a microphone that collects sound in vicinity of the another device,
a loudspeaker,
a memory, and
a processor.

According to such configuration, in a situation where an infant who is the first user and the another device which is the second user are having a conversation, the device can be started to output a speech of a content without inputting an activation instruction for the content.

In the foregoing configuration, the first user may be an adult,
the second user may be another device different from the device, and
the another device may include
a microphone that collects sound in vicinity of the another device,
a loudspeaker,
a memory, and
a processor.

According to such configuration, in a situation where an adult who is the first user and the another device which is the second user are having a conversation, the device can be started to output a speech of a content without inputting an activation instruction for the content.

In the foregoing configuration, the first user may be another device different from the device, the second user may be an adult, and
the another device may include
a microphone that collects sound in vicinity of the another device,
a loudspeaker,
a memory, and
a processor.

According to such configuration, in a situation where the another device which is the first user and an adult who is the second user are having a conversation, the device can be started to output a speech of a content without inputting an activation instruction for the content.

In the foregoing configuration, the content may be a content for helping an infant to learn a life habit.

According to such configuration, when the first user and the second user spoke the first word and the second word relating to life habits, a speech of a content for helping to learn life habits is output without inputting an activation instruction for the content by one of the users. Therefore, it allows one of the users to hear a speech associated with a content while preventing that user from finding out that the speech is output in response to an activation instruction by the other user, thereby enhancing an assisting effect in teaching disciplines.

In the foregoing configuration, the first word may include meaning of refusal or a negative word.

For example, in a situation where the second user who is a guardian is teaching the first user who is a protected person disciplines, it is effective to output a speech associated with a content from the device when the second user spoke a word that tries to make the first user take a certain action, and the first user spoke a word to refuse or deny that action. In such configuration, meaning of refusal or a negative word is included as the first word. Thus, it is possible to cause the device to output a speech associated with a content when the first user refuses to take the action demanded by the second user. Accordingly, the device can assist teaching of disciplines in a situation where assistance in teaching discipline is needed.

In the foregoing configuration, the first word may include a predetermined word associated with the content.

In such configuration, it is possible to cause the device to output a speech associated with a content when the first user who is a guardian or another device spoke the predetermined word as the first word.

The present disclosure may be implemented as a robot in which such device is installed, a method including respective characteristic steps that are included in such device, and a computer program that causes a computer to execute respective characteristic steps. Further, it goes without saying that such computer program can be distributed using a non-transitory computer-readable recording medium such as a CD-ROM and the like or a communication network such as the Internet and the like.

It should be noted that embodiments which will be described below each illustrate a specific example of the present disclosure. Numeric values, shapes, constituting elements, steps, sequences of the steps, and the like described in the following embodiments are mere examples, and not intended to limit the present disclosure. Further, of constituting elements in the following embodiments, constituting elements that are not described in an independent claim representing the broadest concept will be described as optional constituting elements. Further, in all the embodiments, respective subject matters may be combined.

Embodiment

General Configuration

FIG. 1 is a block diagram illustrating one example of a configuration of a robot according to an embodiment of the present disclosure. A robot 1 illustrated in FIG. 1 includes a sensor input part 100, an action performance part 200, and an output part 300.

The sensor input part 100 includes a speech input part 101.

The speech input part 101 is, for example, composed of a microphone and collects speeches in the vicinity of the robot 1.

The action performance part 200 includes a speech input detection part 201, a speaker determination part 202, speech recognition part 203, a registered term presence/absence determination part 204, a time stamp update part 205, a content performance part 206, a control instruction generation part 207, and a memory 208.

The elements constituting the action performance part 200 except the memory 208 are, for example, implemented by executing a program for performing an action process by a processor such as a CPU and the like. The program for performing an action process is stored in the memory 208 installed in the robot 1 or a memory installed in a terminal that is communicably connected with the robot 1. Alternatively, all the elements constituting the action performance part 200 may be mounted in the same robot 1 or the same terminal. Alternatively, all the elements constituting the action performance part 200 may be implemented by respectively installing in another terminal or a server that is connected by an arbitrary network such as an optical fiber, a wireless connection, a public telephony circuit, and the like and by communicating therewith. Alternatively, part of the elements of the action performance part 200 may be mounted in the robot 1, and the remaining elements may be mounted in a server.

The speech input detection part 201 detects reception of speech input by the speech input part 101. Here, for example, when speech data having sound volume equal to or higher than a sound volume that can be considered as no sound is obtained from the speech input part 101, the speech input detection part 201 may determine that a speech is input to the speech input part 101 and start outputting speech data to the speaker determination part 202. Further, when speech data having sound volume less than the sound volume that can be considered as no sound continues a predetermined time period, the speech input detection part 201 may stop the outputting of speech data to the speaker determination part 202.

The speaker determination part 202 determines, of a plurality of users having registered in advance, which user gives the speech represented by the speech data received from the speech input detection part 201 by looking up a speaker registration table T1 illustrated in FIG. 3. FIG. 3 is a diagram illustrating one example of the speaker registration table T1. The speaker registration table T1 includes "No." field, "Registered speaker" field, and "Voiceprint" field. "No." field registers the numbers for identifying records constituting the speaker registration table T1. "Registered speaker" field registers names or identifiers of users who have been determined as recognition targets in advance. In the example of FIG. 3, as the registered speakers, User A and User B are registered. In this example, a child is registered as User A, and a mother of the child is registered as User B. "Voiceprint" field registers voiceprints of respective registered speakers registered in "Registered speaker" field. Here, the voiceprints of User A and User B are registered.

Note that User A corresponds to one of the first user and the second user, and User B corresponds to the other of the first user and the second user.

Accordingly, upon receipt of input of speech data from the speech input detection part 201, the speaker determination part 202 determines which registered speaker gives the input speech data by comparing that speech data and each of the voiceprints registered in the speaker registration table T1.

Referring back to FIG. 1, the speech recognition part 203 performs a speech recognition process on the speech data for which the registered speaker is identified by the speaker determination part 202 and converts that speech data to a string representing a subject of speech that the registered speaker spoke. Here, the speech recognition part 203 may convert the speech data to the string by using, for example, an acoustic model such as a hidden Markov model and the like and a language model such as an n-gram and the like.

The registered term presence/absence determination part 204 determines whether or not a preregistered word is included in the string converted by the speech recognition part 203 by looking up a performance trigger table T2 illustrated in FIG. 4. FIG. 4 is a diagram illustrating one example of the performance trigger table T2. The performance trigger table T2 is a table that stores, for each of a plurality of contents, words serving as performance trigger for each of the users who are the recognition targets.

Specifically, the performance trigger table T2 allocates one record for one content and includes "No.", "Content", "User A", and "User B" fields. "No." field registers the numbers identifying respective records constituting the performance trigger table T2. "Content" field registers a content name that is information for identifying the content. Further, "User A" field includes "Term" field and "Time" field. "Term" field of "User A" registers a word of User A that serves as a performance trigger of a corresponding content. "Time" field of "User A" registers a most current time-of-speech of the word of User A that serves as the performance trigger.

Similarly, as in "User A" field, "User B" field also includes "Term" field and "Time" field. In the fields of "User B", a word of User B that serves as a performance trigger of a corresponding content and a most current time-of-speech of that word spoken by User B are registered.

Here, as the content, a content that help User A who is a child to learn life habits, namely, a content that assist in teaching disciplines to User A is used.

In the example of FIG. 4, as the contents, "carrots", "tidying", "toilet", "sleeping", and "brushing-teeth" are registered.

The "carrots" content is a content for helping a child who don't like to eat carrots to eat carrots or causing a child to become fond of carrots, and is, for example, a content causing the robot 1 to speak a story relating to carrots. For example, as the story relating to carrots, a child story explaining how much a person can be stronger when the person eat carrots may be used.

The "tidying" content is a content for helping a child who don't like tidying to do tidying, and is, for example, a content causing the robot 1 to speak a story that promotes a motivation of the child for tidying.

The "toilet" content is a content that causes the robot 1 to speak a story that motivates a child who is not good with a toilet to go the toilet. The "sleeping" content is a content for causing a child who often stays up late to go to bed early, and is, for example, a content causing the robot 1 to guide a child to a bedroom by use of a conversation with the child and to read a picture book or speak a lullaby for the child.

The "brushing-teeth" content is a content for causing the robot 1 to speak a story that promotes a motivation of a child who don't like to brush teeth for brushing teeth, and is, for example, a content causing the robot 1 to speak a story in an understandable way for the child that a person will have an awful trouble if the person does not brush teeth.

The words serving as the performance trigger of the content registered in the performance trigger table T2 include words that are expected to be included in a conversation between a child and a mother in a situation where an applicable content needs to be performed.

For example, it is preferable that the "carrots" content is performed in a situation where a child who finds carrots served on a dining table says, "I don't like carrots", and in response to that speech, a mother says, "Let's eat carrots." Accordingly, in the performance trigger table T2, for the "carrots" content, the word "don't like", refusing to eat carrots or denying carrots, and the word "carrots" are registered in a manner associated with one another, as the word serving as the performance trigger of User A who is a child and as the word serving as the performance trigger of User B who is a mother, respectively.

It is preferable that the "tidying" content is performed, for example, in a situation where a mother says, "Let's tidy up toys", and in response to that speech, a child says, "No. I don't want to tidy up." Accordingly, in the performance trigger table T2, for the "tidying" content, the word "No", refusing to tidy, and the word "tidying" are registered in a manner associated with one another, as the word serving as the performance trigger of User A who is a child and as the word serving as the performance trigger of User B who is a mother, respectively.

Based on similar considerations, in the performance trigger table T2, for the "toilet" content, the word "don't want to go", refusing to go to a toilet, and the word "toilet" are stored in a manner associated with one another as the word serving as the performance trigger. Further, in the performance trigger table T2, for the "sleeping" content, the word "don't want to sleep", refusing to sleep, and the word "Aren't you going to sleep", prompting sleeping are stored in a manner associated with one another as the word serving as the performance trigger. Further, in the performance trigger table T2, for the "brushing-teeth" content, the word "don't want to", refusing to brush teeth, and the word "brushing teeth" are registered in a manner associated with one another.

Note that, in the performance trigger table T2, the word stored in "Term" field of "User A" corresponds to one example of the first word including meaning of refusal or a negative word, and the word stored in "Term" field of "User B" corresponds to one example of the first word including a predetermined word. As the predetermined word, terms to be used by a mother to prompt a child to perform actions relating to life habits or words included in such terms may be used.

Alternatively, the performance trigger table T2 of FIG. 4 may be configured in such a way that the word serving as the performance trigger is changeable by a user. For example, in a situation where eating carrots, the word "don't like" may be changed to "No" when, for example, a child commonly says, "No", that has the same meaning as the word "don't like."

In the performance trigger table T2 of FIG. 4, a pair of words is associated with the one content. However, this is one of examples, and plural pairs of words may alternatively be associated with one content. For example, with the "carrots" content, in addition to the pair of the words, "don't like" and "carrots", a pair of words, "don't want to eat" and "carrots", may be associated. Further, the performance trigger table T2 may be configured in such a way that a user can add such pair at his/her discretion.

Referring again to FIG. 1, when the registered term presence/absence determination part 204 determines that a registered term is present, the time stamp update part 205 updates the time-of-speech registered in "Time" field associated with the corresponding word of the corresponding user to current time in the performance trigger table T2 illustrated in FIG. 4.

Referring to FIG. 4, for example, when it is recognized that User A says, "don't' like", the time stamp update part 205 updates the time-of-speech currently registered for the word "don't like" to current time.

Referring again to FIG. 1, when the time stamp update part 205 updates the time-of-speech of a certain word WA to time-of-speech tA, the content performance part 206 reads out the time-of-speech tA and time-of-speech tB of a word WB associated with the word WA from the performance trigger table T2 and performs a content associated with the word WA and the word WB when the time difference between the time-of-speech tA and the time-of-speech tB is equal to or less than a predetermined time. Here, as the predetermined time, a predetermined time period that justifies an assumption that User A and User B are having a conversation is used, and, for example, a time such as five seconds, ten seconds, and the like may be used. Further, the content performance part 206 outputs an output request of command to the control instruction generation part 207 when a need to operate the output part 300 arises. For example, for the "carrots" content, when the robot 1 is made to speak a story relating to carrots, the content performance part 206 outputs an output request of a command to the control instruction generation part 207 for causing the robot 1 to speak that story.

Upon receipt of the output request of command from the content performance part 206, the control instruction generation part 207 outputs a command to at least one of a speech output part 301 and an actuator control part 302. For example, when the control instruction generation part 207 receives the output request of a command for causing to speak a story relating carrots, the control instruction generation part 207 outputs, to the speech output part 301, a command to make the robot 1 speak that story. Further, when the control instruction generation part 207 receives the output request of a command for guiding a child to a bedroom, the control instruction generation part 207 outputs, to the actuator control part 302, a command to move the robot 1 from a current location to the bedroom.

The memory 208 is composed of a non-volatile storage device and stores the speaker registration table T1 illustrated in FIG. 3 and the performance trigger table T2 illustrated in FIG. 4.

The output part 300 includes the speech output part 301 and the actuator control part 302. The speech output part 301 outputs, to a loudspeaker, a speech signal corresponding to the command output from the control instruction generation part 207, thereby outputting a speech representing the speech signal from the loudspeaker. For example, when the speech output part 301 receives the command to speak a story relating to carrots, the speech output part 301 outputs a speech signal of the story relating to carrots to the loudspeaker.

The actuator control part 302 outputs a control signal associated with the command output from the control instruction generation part 207 to an actuator or a motor of the robot 1.

Note that in a case where the action performance part 200 is mounted on a terminal communicably connected to the robot 1 via a wireless connection or a wired connection and the speech output part 301 and the actuator control part 302 are mounted on the robot 1, the speech output part 301 and the actuator control part 302 may receive the command transmitted from the control instruction generation part 207 via the wireless connection or the wired connection.

Figure 2:
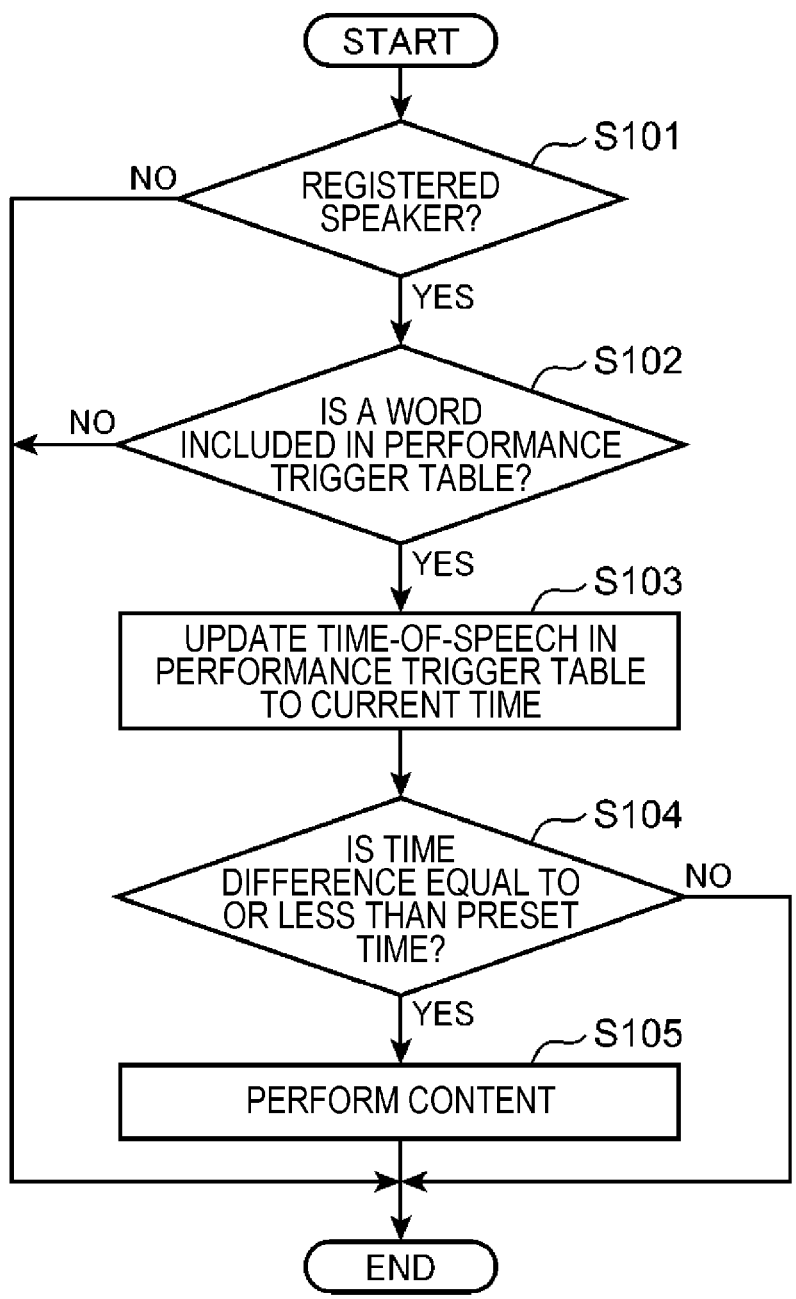
FIG. 2 is a flowchart illustrating one example of a process of the robot illustrated in FIG. 1.

FIG. 2 is a flowchart illustrating one example of a process of the robot 1 illustrated in FIG. 1. Using FIG. 2, a situation where the "carrots" content is performed by the robot 1 in response to a speech of User A who is a child and a speech of User B who is a mother is described below. Note that the flowchart of FIG. 2 is repeated at predetermined intervals.

When User B who is a mother says, "Aren't you going to eat carrots?", the speech input detection part 201 detects that the speech input part 101 receives input of a speech and outputs speech data to the speaker determination part 202, and the speaker determination part 202 looks up the speaker registration table T1 illustrated in FIG. 3 and determines whether or not the speech represented by that speech data is a speech of a registered speaker (S101).

Here, since User B is registered in the speaker registration table T1, the speaker determination part 202 determines that the speech data in question is the speech data of User B (YES at S101). In this case, the speech data in question is converted into a string by the speech recognition part 203 and output to the registered term presence/absence determination part 204. On the other hand, when the speech represented by the speech data in question does not correspond to any of speeches of the registered speakers registered in the speaker registration table T1 (NO at S101), the process ends.

At S102, the registered term presence/absence determination part 204 determines whether or not the string converted by the speech recognition part 203 includes any word registered in the performance trigger table T2. Here, the string "Aren't you going to eat carrots?" includes the word "carrots" registered in the performance trigger table T2 as the word serving as the performance trigger of User B. Accordingly, the registered term presence/absence determination part 204 determines YES at S102. On the other hand, when the string converted by the speech recognition part 203 includes none of the words registered in the performance trigger table T2 as the word serving as the performance trigger of User B, it is determined NO at S102, and the process ends.

At S103, with regard to the corresponding word serving as the performance trigger, the time stamp update part 205 updates the time-of-speech registered in the performance trigger table T2 to current time. Here, since the current time is twelve fifteen and fifteen seconds, the time-of-speech of the word "carrots" of User B illustrated in a cell C402 of FIG. 4 is updated to "12:15:15". Here, the example is described wherein the time-of-speech of User B is updated. Further, as in the case with User B, the time-of-speech of User A is also updated. As described above, the time-of-speech in the performance trigger table T2 is updated every time the word serving as the performance trigger is spoken by the corresponding user. Accordingly, the performance trigger table T2 registers the most current time-of-speech at which the word serving as the performance trigger is spoken by the corresponding user.

At S104, the content performance part 206 looks up the performance trigger table T2 and determines whether or not the time difference between the time-of-speech of the word "don't like" associated with the word "carrots" for which the time-of-speech is updated at S103 and the time-of-speech of the word "carrots" is equal to or less than the predetermined time. Here, as illustrated in the cell C402, the time-of-speech of the word "carrots" is twelve fifteen and fifteen seconds, and the time-of-speech of the word "don't like" is twelve fifteen and ten seconds as illustrated in a cell C401. Thus, the time difference between the two time-of-speeches is five seconds. Accordingly, in a case where the predetermined time is ten seconds, the time difference is equal to or less than the predetermined time. Thus, it is determined as YES at S104. On the other hand, when the time difference is larger than the predetermined time, it is determined as NO at S104, and the process ends.

At S105, the content performance part 206 performs the content associated with the word pair serving as the performance trigger and whose time difference is determined as equal to or less than the predetermined time, and the process ends. Here, the "carrots" content is associated with the word pair of the word "carrots" and the word "don't like". Accordingly, the content performance part 206 performs the "carrots" content.

As described above, according to the present embodiment, a speech of a content associated with the word WA and the word WB is output when it is detected that a speech of User B includes the word WB if the word WA associated with the word WB and spoken by User A is registered in the performance trigger table T2 and the time difference between the time-of-speech to of the word WA and the time-of-speech tB of the word WB is equal to or less than the predetermined time.

This enables to output a speech based on a content without inputting an activation instruction of the content by User B who is a mother, thereby preventing User A from finding out that the output speech is output in response to an operation by User B.

Robot

Figure 6:
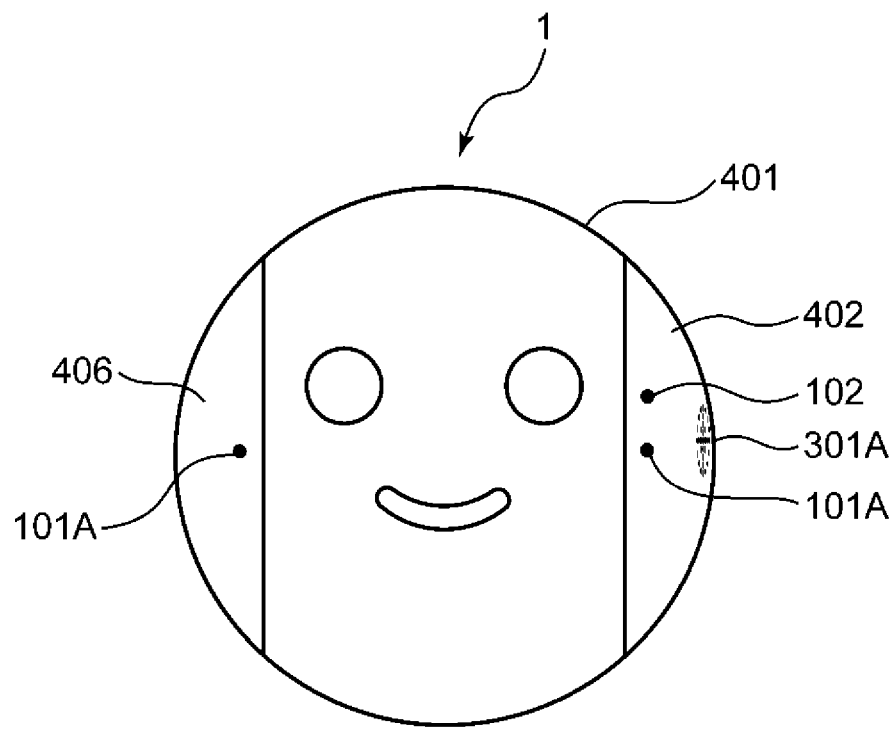
FIG. 6 is a diagram illustrating one example of an exterior shape of the robot illustrated in FIG. 1.

Next, a mechanical structure of the robot 1 illustrated in FIG. 1 is described. FIG. 6 is a diagram illustrating one example of an exterior shape of the robot 1 illustrated in FIG. 1. The robot 1 includes, as illustrated in FIG. 6, a main housing 401 having a spherical zone shape, a first spherical crown part 402, and a second spherical crown part 406, and the main housing 401, the first spherical crown part 402, and the second spherical crown part 406 constitute a sphere as a whole. In other words, the robot 1 has a spherical shape.

Further, as illustrated in FIG. 6, the robot 1 includes a pair of cameras 101A in each of the first spherical crown part 402 and the second spherical crown part 406, and the first spherical crown part 402 includes a microphone 102 and a loudspeaker 301A. The camera 101A is installed in the first spherical crown part 402 and the second spherical crown part 406 in such a way that its optical axis is, for example, directed to the front of the robot 1.

In FIG. 6, the example is described where the cameras 101A constitute a stereo camera. However, in a case where the camera 101A is composed of a depth camera or a monocular camera, the camera 101A is installed in only one of of the first spherical crown part 402 and the second spherical crown part 406. The loudspeaker 301A outputs, to an external space, a speech signal output from the speech output part 301 illustrated in FIG. 1. The microphone 102 corresponds to the speech input part 101 illustrated in FIG. 1 and collects speeches in the vicinity of the robot 1.

Figure 7:
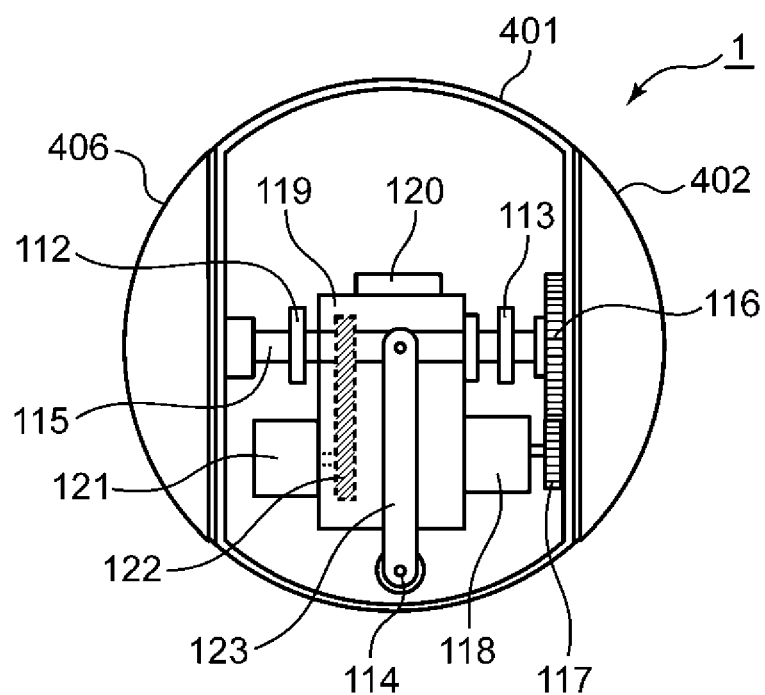
FIG. 7 is a view of inside of the robot illustrated in FIG. 6 when viewed from back.

FIG. 7 is a view of inside of the robot 1 illustrated in FIG. 6 when viewed from back. A shaft 115 extending in a lateral direction connects the first spherical crown part 402 and the second spherical crown part 406. On the other hand, the shaft 115 is not connected to the main housing 401.

The main housing 401 includes a fixed first gear 116, a second gear 117 engaging the first gear 116, a motor 118 connected to the second gear 117, and a frame 119 to which the motor 118 is fixed. Since the frame 119 is hung from the shaft 115, the frame 119 does not rotate even the shaft 115 rotates.

When the motor 118 starts driving, the second gear 117 connected to the motor 118 rotates, and its drive power is transmitted to the first gear 116 engaging the second gear 117. This causes the main housing 401, to which the first gear 116 is fixed, to rotate in synchronization with the driving of the motor 118. Accordingly, the robot 1 moves forward when the motor 118 rotates in a forward direction, and the robot 1 moves backward when the motor 118 rotates in a backward direction.

The motor 118 rotates based on the control of the actuator control part 302 illustrated in FIG. 1. This enables the actuator control part 302 to move the robot 1 forward or backward.

A weight 114 is attached to the frame 119 with a pair of arms 123 interposed therebetween. The weight 114 is sandwiched by the pair of arms 123 at lower end part thereof, and upper end part of the pair of arms 123 is attached to the frame 119 in such a way that the pair of arms 123 pivots freely in a roll direction of the robot 1. A motor (not-illustrated) for turning the pair of arms 123 in the roll direction is installed inside of the frame 119. According to this, the robot 1 turns right when the main housing 401 rotates in the forward direction while the weight 114 being turned to the right side when viewed from behind. On the other hand, the robot 1 turns left when the main housing 401 rotates in the forward direction while the weight 114 being turned to the left side when viewed from behind. The actuator control part 302 illustrated in FIG. 1 can turn the robot 1 to the right by driving the motor 118 in the forward direction while rotating the motor (not-illustrated) by a predetermined angle to the right side. Similarly, the actuator control part 302 can turn the robot 1 to the left by driving the motor 118 in the forward direction while rotating the motor (not-illustrated) by a predetermined angle to the left side.

The motor 121 is a motor for rotating the shaft 115. When the motor 121 rotates in the forward direction, its rotating power is transmitted to the shaft 115 via a belt 122, and the shaft 115 rotates downward in a pitch direction. On the other hand, when the motor rotates in the backward direction, its rotating power is transmitted to the shaft 115 via the belt 122, and the shaft 115 rotates upward in the pitch direction. According to this, the first spherical crown part 402 and the second spherical crown part 406 attached to the shaft 115 rotate in conjunction with a display part that displays eyes and a mouth of the robot 1 attached to an arm 113. As a result, the direction of the eyes and the mouth of the robot 1 and the direction of the optical axis of the camera 101A are changed downward or upward in the pitch direction.

The present disclosure can use the following modified examples.

Modified Example 1

The foregoing embodiment is applied to a conversation between users. However, the present disclosure is not limited thereto and is also applicable to a conversation between a user and another robot that is different from the robot 1 illustrated in FIG. 1. FIG. 5 is a diagram illustrating one example of a performance trigger table T2' to be used in a case where the robot 1 illustrated in FIG. 1 is applied in a conversation between a user and another robot that is different from the robot 1 illustrated in FIG. 1. In FIG. 5, instead of User B who is a mother, a robot RA and a robot RB that are different from the robot 1 illustrated in FIG. 1 are registered.

It is assumed that, as the robot RA, for example, a robot that serves as a guardian of User A who is a child is used. It is assumed that, as the robot RB, for example, a robot that serves as a friend or a brother of User A who is a child is employed.

Accordingly, in FIG. 5, the same words as those of User B (mother) of FIG. 4 are registered as the words serving as the performance trigger of the robot RA.

Further, in FIG. 5, words to be used when the robot RB invites User A to perform an action relating to life habits together are registered as the words serving as the performance trigger of the robot RB. Specifically, for each content of "carrots", "tidying", "toilet", "sleeping", and "brushing teeth", the word "like", "together", "where", "together", and "together" are respectively registered as the words serving as the performance trigger of the robot RB.

For example, for the "carrots" content, the word "like" is registered as a word serving as the performance trigger of the robot RB. This is to cause the robot 1 to perform the "carrots" content in a situation where User A who is a child sees carrots placed on a dining table and says, "I don't like carrots", the robot RA says, "Let's eat carrots", and the robot RB says, "I like carrots".

Further, for the "tidying" content, the word "together" is registered as a word serving as the performance trigger of the robot RB. This is to cause the robot 1 to perform the "tidying" content, for example, in a situation where the robot RA says, "Let's tidy up", and in response to that speech, User A who is a child says, "I don't like tidying", and the robot RB says, "Let's tidy up together".

In a case where this modified example is used, instead of User B who is a mother, voiceprints of the robot RA and the robot RB are registered in the speaker registration table T1 in connection with the names of the robots. The speaker determination part 202 looks up the speaker registration table T1 and further performs the process of determining the speaker for each of the robot RA and the robot RB.

The speech recognition part 203 converts speech data to a string for each of the robot RA and the robot RB. The registered term presence/absence determination part 204 determines, for each of the strings representing speeches of the robot RA and the robot RB, whether or not the string includes any word registered in the performance trigger table T2'. When the registered term presence/absence determination part 204 determines that the strings representing speeches of the robot RA and the robot RB each include a word registered in the performance trigger table T2', the time stamp update part 205 updates the time-of-speech of the corresponding words of the performance trigger table T2' to current time.

Assuming that a word W1 is a word whose time-of-speech is updated and that a word W2 and a word W3 are two words associated with the word W1 and registered in the performance trigger table T2', the content performance part 206 may perform a content associated with the word W1 when time difference ΔT1 between time-of-speech t1 of the word W1 and time-of-speech t2 of a later one of the word W2 and the word W3, whose time-of-speech is later (here, the later word is assumed to be the word W2).

Alternatively, the content performance part 206 may perform the content associated with the word W1 when the time difference ΔT1 between the time-of-speech t1 of the word W1 and the time-of-speech t2 of the word W2 is equal to or less than a predetermined time, and time difference ΔT2 between the time-of-speech t2 of the word W2 and time-of-speech t3 of the word W3 is equal to or less than a predetermined time.

Note that, in the performance trigger table T2' illustrated in FIG. 5, the word serving as the performance trigger for the robot RB that serves as a friend or a brother of the child may be omitted.

In this case, the content performance part 206 determines whether or not a content based on a conversation between User A and the robot RA is to be performed.

Note that, in the modified example 1, the robot RA and the robot RB may have the same configuration as the robot 1 illustrated in FIG. 1 and FIG. 6. In this case, the speech input part 101 corresponds to one example of the microphone, the loudspeaker 301A illustrated in FIG. 6 corresponds to one example of the loudspeaker, and the action performance part 200 corresponds to one example of the processor and the memory.

Modified Example 2

In the foregoing embodiment, a child is used as User A, but an adult may alternatively be used. For example, there is a situation where User B helps a senior person or a husband who lives together with User B to learn life habits. In such situation, the present disclosure may be applicable.

Modified Example 3

In the foregoing modified example 1, a child is used as User A, but an adult may alternatively be used. For example, in future society, a situation may be expected, where the robot RA taking on the role of a caregiver, who takes care of User A, helps User A, who is a care-receiver, to learn life habits on behalf of the caregiver. In such situations, the present disclosure may be applicable.

Modified Example 4

In the foregoing embodiment and the modified example 1, a child is used as User A, but an infant may alternatively be used. Here, the infant is, for example, a preschool child who is in a language acquisition stage.

Modified Example 5

In the embodiment 1, a mother is used as User B, but a guardian of User A who is a child may alternatively be used. The guardian may be a father or a grandparent of User B.

Modified Example 6

The present disclosure is applied to the robot illustrated in FIG. 1, but it is one example, and the present disclosure may be applied to a device including a robot in general. The device includes, for example, a television or a home electronics appliance such as audio equipment and the like.

Modified Example 7

In the embodiment 1, the robot 1 illustrated in FIG. 6 is used as the robot, but the present disclosure is not limited thereto and may be applicable to a different robot.

The present disclosure is advantageous in hiding an instruction to perform a content and making a person think that a robot autonomously decides and acts.

What is claimed is:

1. A device for interacting with a plurality of users, the device comprising:
   a microphone that collects sound in a vicinity of the device;
   a speaker;
   a memory; and
   a processor, wherein the processor
      determines whether or not the sound includes speech of a first user,
      determines, when the sound includes the speech of the first user, whether or not the sound includes a first word, the first word being stored in the memory and associated with the first user, the memory at least linking the plurality of users, words associated with the plurality of users, and times at which the words associated with the plurality of users are last spoken,
      determines, when the sound includes the first word, whether or not a difference between a first time and a second time is equal to or less than a predetermined time, the first time being a current time at which the first user spoke the first word, the second time being a time at which a second user last spoke a second word associated with the first word, the second user being different from the first user, the first word and the second word each being stored with an association with a same content in the memory, and
      causes, when the difference between the first time and the second time is equal to or less than the predetermined time, the speaker to output speech associated with the same content,
   wherein the same content is stored in the memory as a third word,
   the second word, which is stored in the memory with the association with the same content, is same as the third word, and the first word, which is stored in the memory with the association with the same content, is a negative word for at least one of refusing or denying the same content.

2. The device according to claim 1, wherein
the processor further
   updates, when the sound includes the first word, a time at which the first user last spoke the first word to the first time in the memory.

3. The device according to claim 1, wherein
the first user is a guardian of the second user.

4. The device according to claim 3, wherein
the first word includes a predetermined word associated with the same content.

5. The device according to claim 1, wherein
the first user is a second device different from the device,
the second user is a minor, and
the second device includes
   a microphone that collects sound in a vicinity of the second device,
   a speaker,
   a memory, and
   a processor.

6. The device according to claim 5, wherein
the first word includes a predetermined word associated with the same content.

7. The device according to claim 1, wherein
the second user is a guardian of the first user.

8. The device according to claim 7, wherein
the first word includes a meaning of refusal or a negative word.

9. The device according to claim 1, wherein
the first user is a minor,
the second user is a second device different from the device, and
the second device includes
   a microphone that collects sound in a vicinity of the second device,
   a speaker,
   a memory, and
   a processor.

10. The device according to claim 9, wherein
the first word includes a meaning of refusal or a negative word.

11. The device according to claim 1, wherein
the first user is an adult,
the second user is a second device different from the device, and
the second device includes
   a microphone that collects sound in a vicinity of the second device,
   a speaker,
   a memory, and
   a processor.

12. The device according to claim 11, wherein
the first word includes a predetermined word associated with the same content.

13. The device according to claim 1, wherein
the first user is a second device different from the device,
the second user is an adult, and
the second device includes
   a microphone that collects sound in a vicinity of the second device,
   a speaker,
   a memory, and
   a processor.

14. The device according to claim 13, wherein
the first word includes a predetermined word associated with the same content.

15. The device according to claim 1, wherein
the content is for teaching a minor a life lesson.

16. A robot, comprising:
the device according to claim 1.

17. A method for a device that interacts with a plurality of users, the device including a microphone that collects sound in a vicinity of the device, a speaker, a memory, and a processor, the method comprising:
   determining whether or not the sound includes speech of a first user;
   determining, when the sound includes the speech of the first user, whether or not the sound includes a first word, the first word being stored in the memory and associated with the first user, the memory at least linking the plurality of users, words associated with the plurality of users, and times at which the words associated with the plurality of users are last spoken;
   determining, when the sound includes the first word, whether or not a difference between a first time and a second time is equal to or less than a predetermined time, the first time being a current time at which the first user spoke the first word, the second time being a time at which a second user last spoke a second word associated with the first word, the second user being different from the first user, the first word and the second word each being stored with an association with a same content in the memory, and causing, when the difference between the first time and the second time is equal to or less than the predetermined time, the speaker to output speech associated with the same content, wherein the same content is stored in the memory as a third word, the second word, which is stored in the memory with the association with the same content, is same as the third word, and the first word, which is stored in the memory with the association with the same content, is a negative word for at least one of refusing or denying the same content.

18. A non-transitory computer-readable recording medium storing a program for a device, the device for interacting with a plurality of users and including a microphone that collects sound in a vicinity of the device and a speaker, the program, when executed by the device, causing the device to execute operations comprising:

determining whether or not the sound includes a speech of a first user;

determining, when the sound includes the speech of the first user, whether or not the sound includes a first word, the first word being stored in a memory and associated with the first user, the memory at least linking the plurality of users, words associated with the plurality of users, and times at which the words associated with the plurality of users are last spoken;

determining, when the sound includes the first word, whether or not a difference between a first time and a second time is equal to or less than a predetermined time, the first time being a current time at which the first user spoke the first word, the second time being a time at which a second user last spoke a second word associated with the first word, the second user being different from the first user, the first word and the second word each being stored with an association with a same content in the memory; and causing, when the difference between the first time and the second time is equal to or less than the predetermined time, the speaker to output speech associated with the same content, wherein the same content is stored in the memory as a third word, the second word, which is stored in the memory with the association with the same content, is same as the third word, and the first word, which is stored in the memory with the association with the same content, is a negative word for at least one of refusing or denying the same content.

* * * * *